United States Patent [19]

Weber

[11] Patent Number: 4,747,572
[45] Date of Patent: May 31, 1988

[54] COPY AND MATERIAL HOLDER

[76] Inventor: Allan B. Weber, West Lake Rd., Tuxedo Park, N.Y. 10987

[21] Appl. No.: 929,922

[22] Filed: Nov. 12, 1986

[51] Int. Cl.$^4$ .............................................. A47F 37/14
[52] U.S. Cl. .................... 248/442.2; 24/67 R; 248/205.2
[58] Field of Search ............... 248/442.2, 444, 205.2, 248/447, 447.2; 24/67.3, 67 R, 459, 530

[56] References Cited

U.S. PATENT DOCUMENTS

| | | | |
|---|---|---|---|
| 2,505,814 | 5/1950 | Voorhorst | 120/28 |
| 3,675,782 | 7/1972 | Dudley | 211/50 |
| 3,947,138 | 3/1976 | Eshelman | 24/67.3 X |
| 4,197,026 | 4/1980 | Vorbach et al. | 248/442.2 X |
| 4,475,705 | 10/1984 | Henneberg et al. | 248/447.2 |
| 4,582,285 | 4/1986 | Bello | 248/442.2 |
| 4,582,286 | 4/1986 | Mancuso | 248/459 |
| 4,632,471 | 12/1986 | Visnapuu | 248/442.2 |

FOREIGN PATENT DOCUMENTS

| | | |
|---|---|---|
| 0010659 | 5/1980 | European Pat. Off. . |
| 0965128 | 6/1957 | Fed. Rep. of Germany . |
| 2703987 | 8/1978 | Fed. Rep. of Germany . |
| 1145094 | 10/1957 | France . |

*Primary Examiner*—Ramon O. Ramirez
*Attorney, Agent, or Firm*—Michael B. Einschlag

[57] ABSTRACT

Apparatus which removably attaches to a station such as a computer terminal to display and hold materials such as papers, notes and so forth from the right and left side of the computer terminal and to display paper which hangs down from the apparatus and/or which stands up from the apparatus. The holder includes: (1) a head section having first and second flaps attached by hinges to opposite ends of a middle section and having Velcro on one side for removably attaching them to surfaces; (2) a T-section attached by a hinge to a side of the middle section; and (3) a T-insert section which is removably interlockable with the T-section. The T-section and the T-insert section together provide means for removably holding papers and other materials.

24 Claims, 7 Drawing Sheets

COPY AND MATERIAL HOLDER

BACKGROUND OF THE INVENTION

1. Field of the Invention

The present invention relates to apparatus for holding and displaying materials such as papers, floppy disks, various office supplies and, in particular, to such apparatus which can be removably attached to a computer terminal.

2. Description of the Prior Art

Computer terminals are rapidly becoming indispensible equipments in business offices and in some instances in the home. In particular, these terminals are used to enter data into and to retrieve data from computers. Furthermore, most such tasks involve operator interaction at these computer terminals.

A user interacting with a computer at a computer terminal generally needs to have easy and convenient access to materials such as floppy disks, papers, notes, materials and so forth. In addition to accessing these materials, the operator usually needs to display them—in particular, to display papers and notes—in such a manner that his hands remain free to use a keyboard usually associated with the computer terminal. In practice a substantial problem exists in displaying papers and notes because there is generally not enough space available in the area of the computer terminal for this purpose. In addition to merely providing more space for proper display, there is the added problem of displaying materials in such a fashion that the operator can view them and the screen of the computer terminal at the same time without causing physical discomfort.

In addition to the above-identified need for an apparatus to hold and display materials, a further need exists for such apparatus whose position is easily adjustable and which can be used to hold and display materials from either the right or the left side of a computer terminal. A still further need exists for such apparatus which is removably attachable to a computer terminal for use at many different computer terminals. A still further need exists for such apparatus to hold papers that hang down and/or papers that stand up. A still further need exists for such apparatus to be light weight. A still further need exists for such apparatus which enables a user to rapidly and easily affix and remove materials such as papers and notes thereto.

A copy holder, available in the art, suffers from several disadvantages drawbacks. In particular, it: (1) is not removably attachable to computer terminals (2) cannot be used to hold and display papers on the left side or the right side of a computer terminal; (3) does not provide for rapid and easy attachment and/or removal of papers therefrom; and (4) does not hold and display papers which hang down and/or stand up from the apparatus.

As a result, there is a need in the art for apparatus which efficiently and removably attaches to a station such as a computer terminal to hold and display materials and papers from the right and/or left side of the computer terminal and which can display paper which hangs down from the apparatus and which stands up from the apparatus.

SUMMARY OF THE INVENTION

An embodiment of the present invention (1) efficiently and removably attaches to a station such as a computer terminal to display and hold materials such as papers, notes and so forth from the right or left side of the computer terminal and (2) displays paper which hangs down from the apparatus and/or which stands up from the apparatus. In addition, further embodiments of the present invention are fabricated to hold and display floppy disks and other materials.

Embodiments of the present invention for holding and displaying papers and notes comprise: (1) a head section comprising a first flap section attached by a first hinge to a first end of a middle section and a second flap section attached by a second hinge to a second end of the middle section, the first and second flap section further comprising means for removably attaching the flaps to surfaces; (2) a T-section attached at one end by a hinge to a side of the middle section; and (3) a T-insert section having means for removably interlocking the T-insert section into the T-section. The T-section further comprises at least one first means and the T-insert section further comprises at least one second means which first and second means together provide holding means for removably holding papers and other materials.

In a preferred embodiment of the present invention the head section, the T-section and the hinges attaching them are fabricated from polypropolene as a single unit. Further, the first means of the T-section comprises a pair of ridges and the second means of the T-insert section comprises a flange having a ridge substantially at the end thereof. When the T-insert section is interlocked into the T-section, the ridge on the T-insert section is disposed above and substantially between the ridges of the T-section to provide the holding means. Further, holding means are disposed along the upper and lower sides of the T-section extending out from the head section so that papers and so forth may be attached to stand up from and/or hang down from the T-section when it is horizontally disposed.

In the above-described preferred embodiment of the present invention fabricated from polypropolene, the hinge between the head section and the T-section comprises two outer sections disposed on opposite sides and separated by a gap from a middle section. The outer sections of the hinge each comprise a groove between the head section and the T-section to permit rotation thereabout. The middle section comprises an elbow attached at one end to the head section by a first groove and attached at the other end to the T-section by a second groove. The combination of the outer and middle sections permits rotation of the T-section about the side of the head section through an angle of approximately 90°.

In further embodiments of the present invention, the T-insert section may have, instead of the above-described holding means, pockets or means such as hooks disposed along the lower side of the T-section for suspending various pocket means for storing materials such as floppy disks and office materials such as paper clips, disk envelopes and the like.

BRIEF DESCRIPTION OF THE DRAWING

The principles of the present invention may be clearly understood by considering the following detailed description in conjunction with the accompanying drawing, in which.

To facilitate understanding, identical reference numerals have been used to denote identical elements common to the figures.

DETAILED DESCRIPTION

Figure 1:
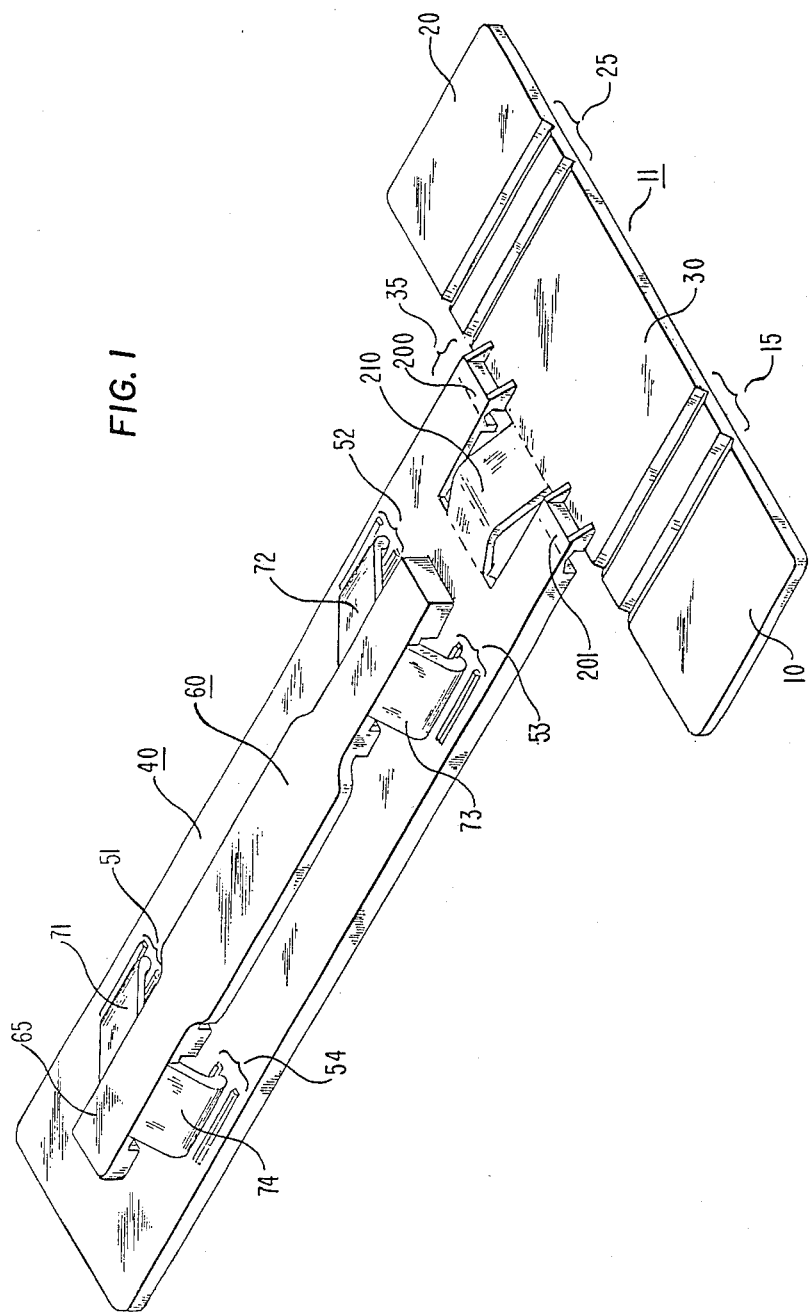
FIG. 1 shows, in pictorial form, an embodiment of the present invention.

FIG. 1 shows a preferred embodiment of the present invention. The embodiment may be removably attached to a computer terminal and used to hold and display papers and other materials when a person interacts with the computer terminal. Head section 11 comprises a middle section 30, connected at either end to flaps 10 and 20, respectively. In the preferred embodiment shown in FIG. 1, all parts are fabricated from a polypropolene material. This material is preferred in part because it is light and nearly indestructible. For this reason one need not worry whether the apparatus will shatter in use. Further, and most important, the polypropolene material has a certain flexibility which is utilized in a manner to be explained in detail below.

Flaps 10 and 20 are attached to middle section 30 by means of hinges 15 and 25, respectively. As shown in FIG. 1, hinges 15 and 25 comprise two wedge-shaped grooves which, due to the flexibility of the polypropolene, allow flaps 10 and 20 to be rotated about the respective ends of middle section 30. In the preferred embodiment, flaps 10 and 20 have an adhesive material, such as that sold under the trademark Velcro (referred to hereinafter as Velcro), attached to one side thereof. This adhesive material: (1) can grip a first surface having a second piece of Velcro adhesive material attached thereto tightly enough to support the apparatus and materials held thereby; (2) can be removed from the first surface and can be used to grip other surfaces; and (3) can grip and be removed many times. In accordance with these well known properties of an adhesive material such as Velcro, a user of the inventive apparatus can attach pieces of Velcro to a computer terminal in several positions. Then the Velcro on flaps 10 and 20 may be attached to and be removed from the Velcro on the computer terminal so that the inventive apparatus may be used in a variety of positions. Further, in this manner, a user of the inventive apparatus may transport it for use with many different computer terminals.

As shown in FIG. 1, T-section 40 entends substantially perpendicularly outward from a side of middle section 30. T-section 40 is affixed to middle section 30 by hinge means 35. In the preferred embodiment of the inventive apparatus shown in FIG. 1, hinge 35 is a molded hinge comprising outer sections 200 and 201 and middle section 210 and will be described in further detail below in connection with FIGS. 9 and 10. Further, in the preferred embodiment, middle section 30, hinge means 35, and T-section 40 are molded from one piece of polypropolene.

Hinge means 35 provides a means by which T-section 40 can be rotated about the side of middle section 30. Hinge means 35 further provides a means for: (1) fixing T-section 40 in a first position where middle section 35 and T-section 40 lie in the same plane and (2) fixing T-section 40 in a second position where the planes of middle section 30 and T-section 40 intersect at substantially a right angle.

T-section 40 has first means 51-54 disposed along its longitudinal extent—means 51 and 52 lying relatively close to the top of T-section 40 and means 53 and 54 lying relatively close to the bottom of T-section 40. Means 51-54 are used, as will be explained in greater detail in conjunction with FIG. 7, in conjunction with cooperating second means on T-insert section 60 to provide holding means for a paper.

T-insert section 60 removably interlocks into T-section 40. It comprises a substantially rectangular central portion 65, flanges 71-74 that project outward from the sides of central portion 65, and, as will be described in greater detail in connection with FIG. 7, means for interlocking into T-section 40. The underside of each flange contains second means, as will be explained in greater detail in connection with FIG. 7, for use in conjunction with cooperating first means on T-section 40 to provide holding means for a paper.

In the preferred embodiment, holding means comprising first means 51-54 and second means disposed under flanges 71-74 are disposed along the lower and upper longitudinal extent of T-section 40 as shown in FIG. 1. This arrangement advantageously allows papers to hang down from the holding means disposed along the lower longitudinal extent of T-section 40 and to stand up along the upper longitudinal extent of T-section 40 at the same time.

Figure 2:
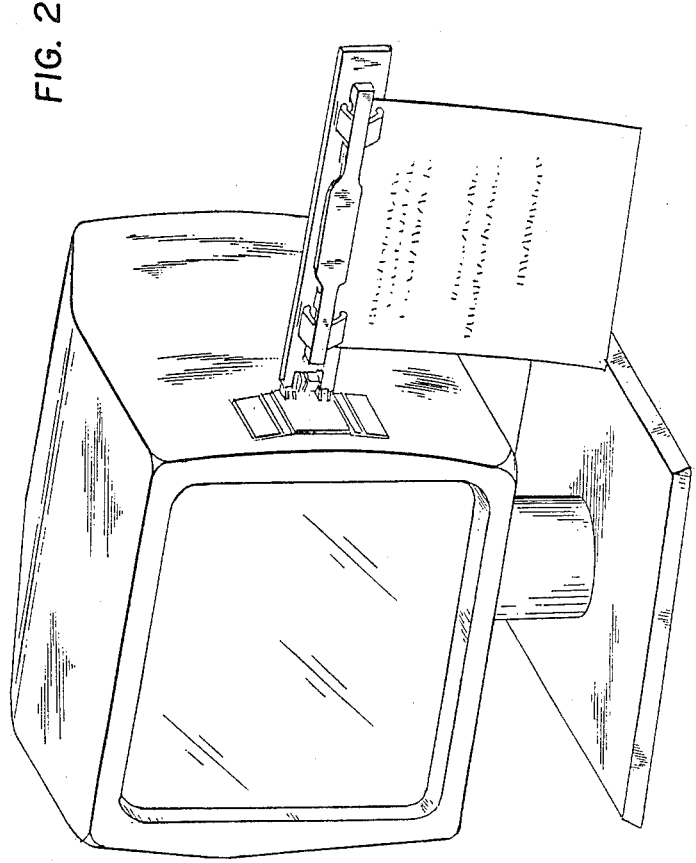
FIG. 2 shows, in pictorial form, an embodiment of the present invention which is holding and displaying a paper while being attached in one useful position to a computer terminal.

FIG. 2 shows one useful position in which the apparatus is attached to a computer terminal. However, the inventive apparatus may be attached to a terminal in other positions. For example, another position of attaching the apparatus to a computer terminal for displaying papers from the right hand side thereof is achieved by attaching flap 10 along the top and horizontally disposed side of the computer terminal and attaching flap 20 along the right and vertically disposed side of the computer terminal; hinge 15 permits attachment around the upper righthand corner of the computer terminal in this example. As described above, the flaps are attached to pieces of an adhesive material, such as Velcro, which are affixed to the computer terminal. In this position of attachment, T-section 40 is disposed back along the right side of the computer terminal. T-section is then rotated 90 degrees toward the front of the computer terminal so that papers can be held and displayed at the right of the computer terminal. It should be clear that many other arrangements for holding and displaying papers on the right side of the computer terminal are possible. In a similar manner, the inventive apparatus may be used to display papers on the left side of the computer terminal by attaching flap 20 along the top and horizontally disposed side of the computer terminal and attaching flap 10 along the left and vertically disposed side of the computer terminal; hinge 25 permits attachment around the upper lefthand corner of the computer terminal in this example. As described above, the flaps are attached to pieces of an adhesive material, such as Velcro, which are affixed to the computer terminal. In this position, T-section 40 is disposed back along the left side of the computer terminal. T-section is then rotated 90 degrees toward the front of the computer terminal so that papers can be held and displayed at the left of the computer terminal. As a consequence, apparatus fabricated in accordance with the present invention may be attached to the left and/or the right side of a terminal, i.e., they are ambidextrous. This capability advantageously enables the inventive apparatus to hold papers in a variety of positions to satisfy the needs of different users. In addition, for the preferred embodiment which comprises holding means disposed along the upper and lower longitudinal extents of T-section 40 and T-insert section 60, paper can hang down from and/or stand up therefrom whether the apparatus disposed on the left or the right side of a computer terminal.

Figure 3:
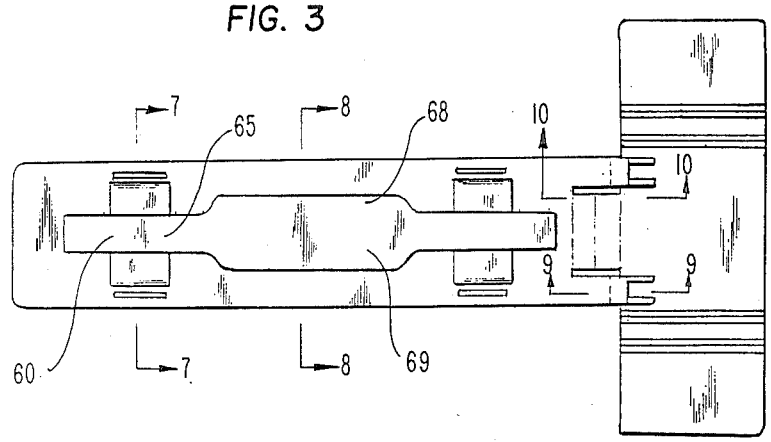
FIGS. 3-6 show, in pictorial form, a top view, a bottom view, and side views, respectively, of the embodiment shown in FIG. 1.
Figure 4:
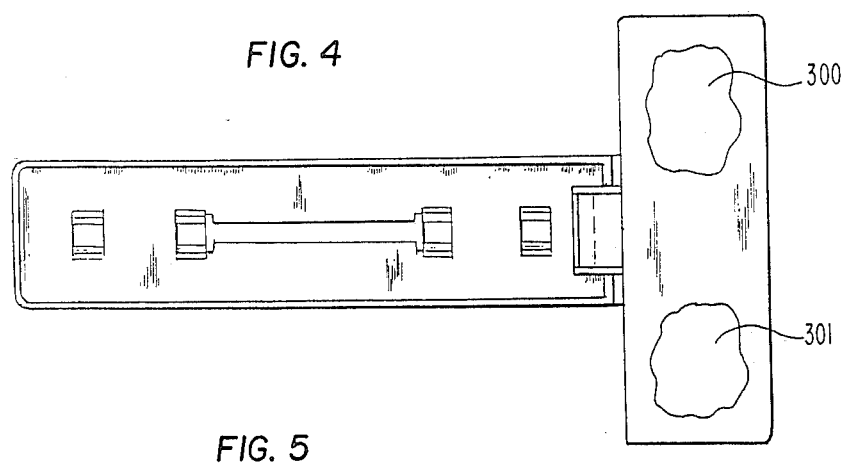
Figure 5:
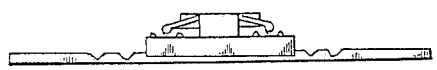
Figure 6:
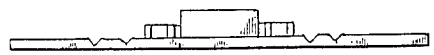

FIGS. 3-6 show a top view, a bottom view, and side views, respectively, of the embodiment shown in FIG. 1 in order to more clearly illustrate the present invention. FIG. 4 shows Velcro adhesive material patches 300 and 301 on flaps 10 and 20, respectively, which are used to grip other patches of Velcro adhesive material affixed to the surfaces of a computer terminal.

Figure 7:
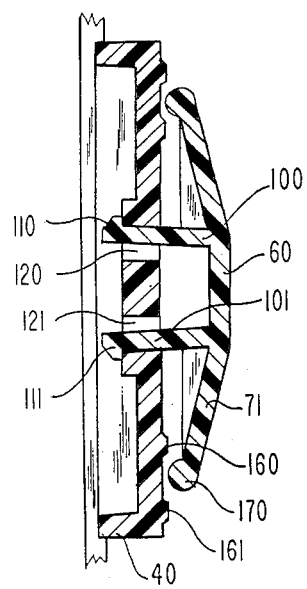
FIG. 7 shows, in pictorial form, a cross section of the embodiment shown in FIG. 1, as viewed in the direction of arrows 7 of FIG. 3, which illustrates (1) means for removably interlocking a T-section and a T-insert section of the embodiment and (2) means for holding paper in accordance with the present invention.

FIG. 7 shows a cross section of the embodiment shown in FIG. 1, as viewed in the direction of arrows 7 of FIG. 3. FIG. 7 therefore comprises a cross section of T-section 40 and T-insert section 60 which illustrates the manner in which a means for removably interlocking T-section 40 and T-insert section 60 is fabricated in accordance with the present invention and the manner in which a holding means for paper is fabricated in accordance with the present invention. Means for removably interlocking T-section 40 and T-insert section 60 comprises: (1) legs 100 and 101 extending downward from T-insert section of 60 which have protuberances 110 and 111 at the ends thereof, respectively, which legs are flexible so that protuberances 110 and 111 can be bent towards each other and (2) slots 120 and 121 in T-section 40 having apertures which are sufficiently large that protuberances 110 and 111 can be pushed therethrough. Slots 120 and 121 are disposed so that flexible legs 100 and 101 must be bent towards each other in order for protuberances 110 and 111 to be inserted into slots 120 and 121, respectively. When protuberances 110 and 111 are inserted into slots 120 and 121, legs 100 and 101 are left to resume their natural disposition and protuberances 110 and 111 spring to a position which causes T-section 40 and T-insert section 60 to be interlocked. The two sections are removed from interlocking engagement by bending legs 100 and 101 toward each other until protuberances 110 and 111 can be pushed up and through slots 120 and 121, respectively. It should be clear to those of ordinary skill in the art that a number of such interlocking means may be used to snappingly interlock T-section 40 and 60.

FIG. 7 also illustrates a holding means which comprises a first means disposed on T-section 40 and a second means disposed on T-insert section 60. A first means disposed on T-section 40 comprises ridges 160 and 161 which are spaced apart and which are disposed substantially parallel to each other. A second means disposed on T-insert section 60 comprises protuberance 170 disposed at the end of flange 71 which extends downwardly from T-insert section 60. When T-insert section 60 is snappingly interlocked into T-section 40, protuberance 170 on flange 71 of T-insert section 60 is disposed between ridges 160 and 161 on T-section 40. Ridges 160 and 161 on T-section 40 and protuberance 170 on T-insert section 60 cooperate to provide a holding means for materials such as paper. The inventive holding means is used by pushing a paper thereinto. In the preferred embodiment, by reason of the flexibility of the polypropolene material out of the apparatus is fabricated, the force of the paper being pushed into the holding means causes the flange to be flexed up to allow the paper to enter. Then, the flange flexes back to hold the paper in place. When the paper is to be removed, it is merely pulled and again the flexibility of the materials allows the flange to flex up to allow the paper to be removed. The polypropolene material advantageously allows the above to occur rapidly and easily without tearing the paper. In order to aid in inserting and removing paper, flanges are provided along T-insert section 60. This is illustrated in FIG. 3. FIG. 3 shows flanges 68 and 69 disposed on area 65 of T-section 60. When paper is inserted or removed from one side of the apparatus, one depresses the one of flanges 68 or 69 which is opposite therefrom. This depressing action will outwardly flex the downwardly depending flanges on T-section 60, such as flange 71 as shown in FIG. 7, and thereby facilitate insertion or removal of papers.

Figure 8:
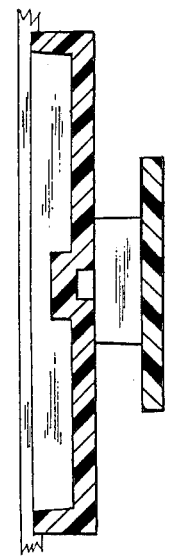
FIG. 8 shows, in pictorial form, a cross section of the embodiment shown in FIG. 1, as viewed in the direction of arrows 8 of FIG. 3.

FIG. 8 shows a cross section of the embodiment shown in FIG. 1, as viewed in the direction of arrows 8 of FIG. 3, in order to more clearly illustrate the present invention.

Figure 9:
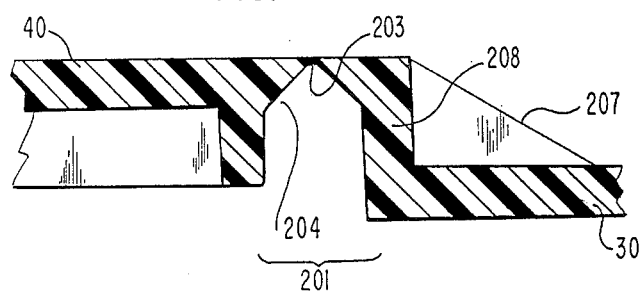
FIG. 9 shows, in pictorial form, a cross section of the embodiment shown in FIG. 1, as viewed in the direction of arrows 9 of FIG. 3, which illustrates a first part of a hinge used to attach a T-section and the middle section of a head section of the embodiment in accordance with the present invention.

As shown in FIG. 1, hinge means 35, used to attach middle section 30 and T-section 40, comprises outer sections 200 and 201 disposed on opposite sides of and separated by gaps from middle section 210. FIG. 9 shows a cross section of the embodiment shown in FIG. 1, as viewed in the direction of arrows 9 of FIG. 3, which illustrates outer section 201 of hinge means 35. In the preferred embodiment of the present invention, T-section 40, middle section 30, and hinge means 35 are fabricated from a single piece of polypropolene. In the preferred embodiment, outer sections 200 and 201 are identical.

FIG. 9 shows the manner in which the side of middle section 30 and T-section 40 are connected to outer section 201. Outer section 201 is formed in the shape of a section of a rectangle, one end of which has a trapezoidal shaped groove 204 formed therein. The hinge opens and closes about the center 203 of groove 204 in order that T-section 40 may rotate about the side of middle section 30. As shown in FIG. 9, wedge 207 is disposed between middle section 30 and connecting section 208 of outer section 201 to provide support and stability for this section of the hinge.

Figure 10:
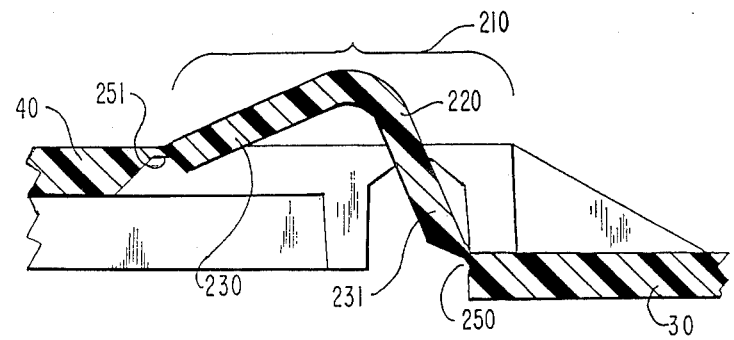
FIG. 10 shows, in pictorial form, a cross section of the embodiment shown in FIG. 1, as viewed in the direction of arrows 10 of FIG. 3, which illustrates a middle part of a hinge used to attach a T-section and the middle section of a head section of the embodiment in accordance with the present invention.

FIG. 10 shows a cross section of the embodiment shown in FIG. 1, as viewed in the direction of arrows 10 of FIG. 3, which illustrates middle section 210 of hinge means 35 and the manner in which the side of middle section 30 and T-section 40 are connected thereto. Middle section 210 comprises an elbow 220. Elbow 220 is connected at one end to middle section 30 by a relatively thin piece of material 250 and is connected at the other end to T-section 40 by a relatively thin piece of material 251. When T-section 40 is disposed outwardly from middle section 30 (referred to as the "flat-position"), leg 230 of elbow 220 forms an obtuse angle with respect to T-section 40 and leg 231 of elbow 230 forms an obtuse angle with respect to middle section 30. When T-section 40 is disposed at substantially a right angle with respect to middle section 30 (referred to as the "bent-position"), leg 230 of elbow 220 forms an obtuse angle with respect to T-section 40 and leg 231 of elbow 230 forms an acute angle with respect to middle section 30. The hinge opens and closes about the center of thin section of material 250. It is believed that in rotating T-section 40 from the flat-position to the bent-position and vice versa, elbow 23 is flexed and then relaxed. The flexion occurs because the axis of rotation for outer sections 200 and 201 is different from that for middle section 210. Thus, one must expend energy to flex elbow 230 when changing positions. As a consequence, when T-section 40 is disposed in either the flat-position or the bent-position, it advantageously tends to remain in that position.

Further embodiments of the present invention can be fabricated wherein some of the holding mechanisms described above which are disposed for hanging papers down from the apparatus are replaced by hanging means affixed to T-insert section 60. In such embodiments items may be hung therefrom while a paper stands up from the apparatus. Indeed some of the items hung may comprise pockets for holding further items such as floppy disks or office supplies such as paper clips and so forth.

Figure 11:
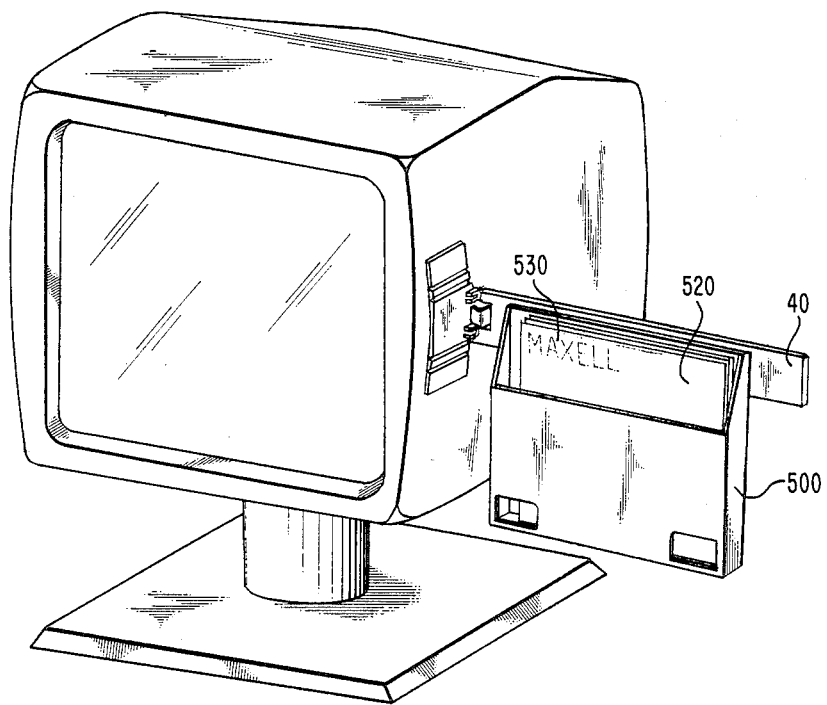
FIG. 11 shows, in pictorial form, an embodiment of the present invention which is holding floppy disks in a pocket while being attached in one useful position to a computer terminal.
Figure 12:
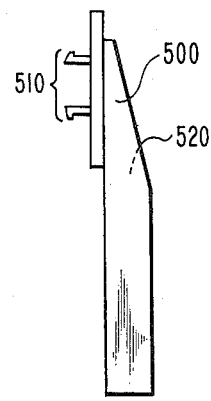
FIG. 12 shows, in pictorial form, a side view of one embodiment of the pocket shown in FIG. 11.

A further embodiment of the present invention is fabricated when T-insert section 60 is replaced entirely with a pocket, for example, pocket 500 shown in FIG. 11. Specifically, the pocket has means for removably interlocking into T-section 40. Means 510 is disposed thereon at a postion relatively close to the top of the pocket 500 and on the opposite side of the opening 520. The means 510 for interlocking may be the same type as is shown in FIG. 7 for T-insert section 60. The inventive pocket means 500 may be used by removing T-insert section 60 from T-section 40 and interlocking the inventive pocket thereinto. As shown in FIG. 11 pocket 500 will be interlocked into T-section 40 so that it hangs down from T-section 40 when T-section 40 is disposed to extend horizontally. Thus, materials, such as floppy disks 530, may be inserted into the pocket and held for storage and use.

Figure 13:
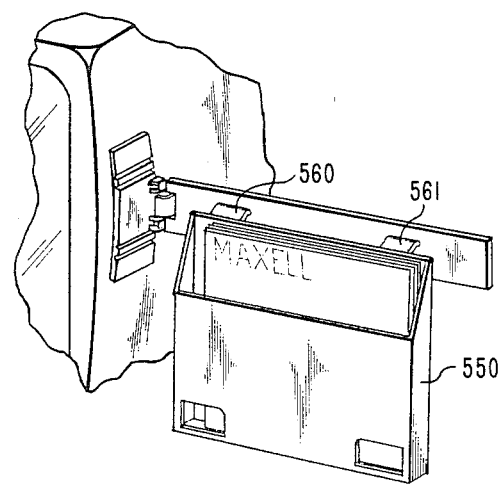
FIG. 13 shows, in pictorial form, an embodiment of the present invention which is used to hold floppy disks and other materials and to hold and display a paper while being attached in one useful position to a computer terminal.

A still further embodiment of the present invention is fabricated when T-insert section 60 is replaced with pocket 550 shown in FIG. 13. Pocket 550, when inserted into T-section 40, extends generally downward and flanges 560 and 561 with second means which cooperate with corresponding first means on T-section 40 to provide holding means for papers, notes and the like. Flanges 560 and 561 are like flanges 73 and 74 of T-insert section 60 shown in FIG. 1. Pocket 550 has means for interlocking like means 510 of pocket 500. Thus, when pocket 550 is 550 interlocked into section 40 pocket hangs down from T-section 40 when T-section 40 is disposed to extend horizontally. Thus, materials, such as floppy disks, may be inserted into the pocket and held for storage and use at the same time that papers and notes can be held and displayed standing up from the inventive apparatus.

Figure 14:
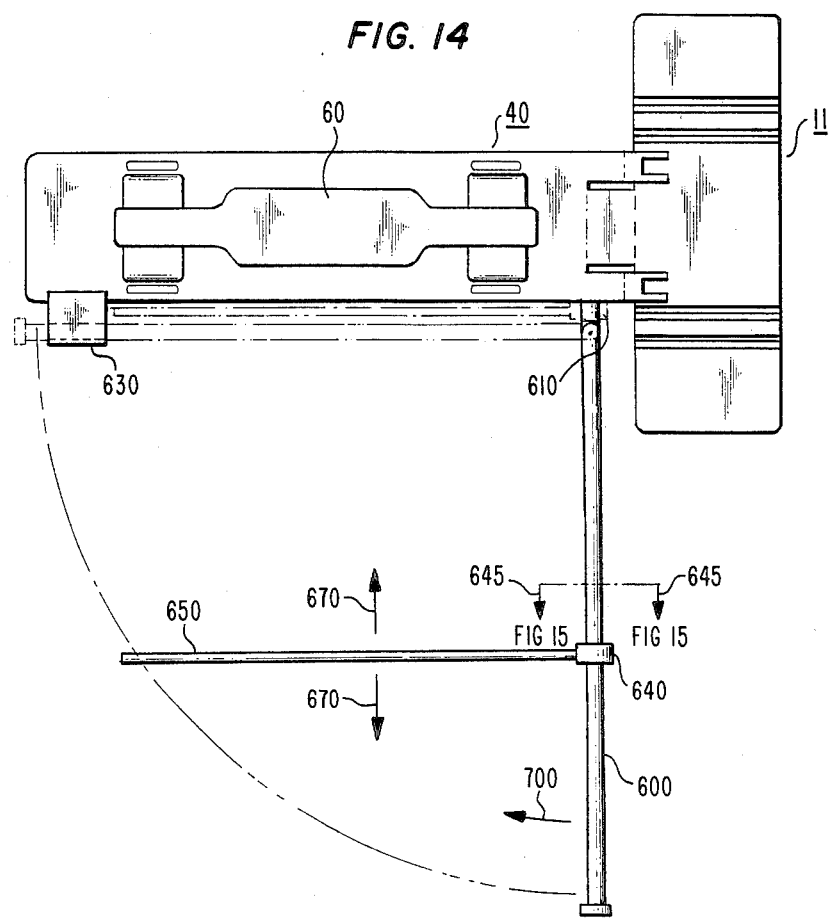
FIG. 14 shows, in pictorial form, a further embodiment of the present invention shown in FIG. 1 which includes further parts which enable users to more easily determine their point of focus on written material.

A still further embodiment of the present invention, shown in FIG. 14, comprises the copy holder shown in FIGS. 1-10 and described above with some additional parts. The first additional part comprises a rod 600 attached at one end to a hinge 610. The hinge 610 is attached to a side of T-section 40 and close to head unit 11. The hinge 610 allows the rod 600 to rotate from a first position where the rod 610 is disposed at substantially a right angle with respect to the bottom edge of T-section 40 along the direction shown by arrow 700 to a second position where the rod 600 is disposed substantially along the bottom side of T-section 40. Further, the hinge 610 interlocks the rod so that it is relatively stable when it is disposed perpendicular to T-section 40. In additional embodiments, T-section 40 may have a catch 630 for holding the rod when it is disposed along the bottom of T-section 40.

The second additional part comprises a further rod 650 having a means disposed at one end thereof for slidably engaging the first rod. When the two rods are slidably engaged, they are disposed at substantially a right angle with respect to each other.

Figure 15:
FIG. 15 shows, in pictorial form, a cross section of a portion of the embodiment shown in FIG. 14, as viewed in the direction of arrows 645.

FIG. 15 shows, in pictorial form, a cross section of the embodiment of FIG. 14, as viewed in the direction of arrows 645. This illustrates the manner in which means 640 and rod 600 are fabricated for slidably engaged interaction. In use, this embodiment is disposed so that the first rod depends downward and the second rod depends substantially horizontally. Then when a paper is inserted for holding and displaying from T-section 40 and T-insert section 60, the second rod may be used to help a reader focus on specific lines of text on the paper. Further, because the second rod slides along the first rod, the position of the second rod can be varied to help the reader focus on various lines on the paper for purposes of inputting text at a computer terminal or at a typewriter.

Although particular embodiments of the present invention have been shown and described herein, many varied embodiments incorporating the teachings of the present invention may be easily constructed by those skilled in the art. For example, although I have described my invention in the context of holding and displaying papers and materials for use in connection with computer terminals this should not be construed to limit the many uses to which embodiments of the present invention may be put. It is within the spirit of the present invention that the present invention may be used in connection with displaying and storing notes and papers for television sets in the home such as programming schedules, in connection with displaying recipes in the home to allow the hands to be free for cooking, and so forth.

I claim:

1. Apparatus for holding materials which is removably attachable to adhesive material affixed to a surface, which apparatus comprises:

a head section comprising a first and a second flap section and a middle section, the first flap section being attached by a first hinge to a first end of the middle section, the second flap section being attached by a second hinge to a second end of the middle section, the first and second flap sections further comprising means for removably attaching the flaps to the adhesive material;

a T-section attached at one end by a hinge means to a side of the middle section; and a T-insert section having means for removably interlocking the T-insert section into the T-section,
  (a) the T-section further comprises at least one first means and
  (b) the T-insert section further comprises at least one second means, which first and second means together provide holding means for holding materials.

2. The apparatus of claim 1 wherein:

the first means comprises a pair of spaced apart ridges the second means comprises a flange having a protuberance disposed thereon in such a fashion that when the T-insert section is interlocked into the T-section the protuberance is disposed over and between the spaced apart ridges.

3. The apparatus of claim 3 wherein the first and second means are disposed along the upper and lower sides of the T-section and T-insert section to provide holding means for holding paper which hangs down from and/or stands up from the T-section when it is horizontally disposed.

4. The apparatus of claim 3 wherein the head section and the T-section are fabricated as a single unit of a material.

5. The apparatus of claim 4 wherein the hinge means comprises:

first and second outer sections, each of which is connected at a first end to the middle section of the head section and at a second end to the T-section, each of which further comprises a groove about which rotation occurs for the outer section; and an elbow connected at a first end by a first relatively thin material to the middle section of the head section and at a second end by a second relatively thin material to the T-section, wherein rotation occurs about the first relatively thin material, the first relatively thin material and the grooves being displaced from each other.

6. The apparatus of claim 5 wherein the head unit, T-section and hinge means comprise polypropolene.

7. The apparatus of claim 6 wherein the first and second hinges comprise grooves cut in the propolene forming the head section.

8. The apparatus of claim 7 wherein the attaching means for the flap sections comprises Velcro adhesive material.

9. Apparatus for holding materials which is removably att achable to adhesive material affixed to a surface, which apparatus comprises:

a head section comprising a first and a second flap section and a middle section, the first flap section being attached by a first hinge to a first end of the middle section, the second flap section being attached by a second hinge to a second end of the middle section, the first and second flap sections further comprising means for removably attaching the flaps to the adhesive material;

a T-section attached at one end by a hinge means to a side of the middle section;- and a T-insert section having means for removably interlocking the T-insert section into the T-section and a pocket for holding materials.

10. The apparatus of claim 9 wherein the head section and the T-section are fabricated as a single unit of a material.

11. The apparatus of claim 10 wherein the hinge means comprises:

first and second outer sections, each of which is connected at a first end to the middle section of the head section and at a second end to the T-section, each of which further comprises a groove about which rotation occurs for the outer section; and an elbow connected at a first end by a first relatively thin material to the middle section of the head section and at a second end by a second relatively thin material to the T-section, wherein rotation occurs about the first relatively thin material, the first relatively thin material and the grooves being displaced from each other.

12. The apparatus of claim 11 wherein the head unit, T-section and hinge means comprise polypropolene and the attaching means for the flap sections comprises Velcro adhesive material.

13. Apparatus for holding materials which is removably attachable to adhesive material affixed to a surface, which apparatus comprises:

a head section comprising a first and a second flap section and a middle section, the first flap section being attached by a first hinge to a first end of the middle section, the second flap section being attached by a second hinge to a second end of the middle section, the first and second flap sections further comprising means for removably attaching the flaps to the adhesive material;

a T-section attached at one end by a hinge means to a side of the middle section; and a T-insert section having means for removably interlocking the T-insert section into the T-section and a pocket for holding materials,
  (a) the T-section further comprises at least one first means and
  (b) the T-insert section further comprises at least one second means, which first and second means together provide holding means for holding materials.

14. The apparatus of claim 13 wherein the head section and the T-section are fabricated as a single unit of a material.

15. The apparatus of claim 14 wherein the hinge means comprises:

first and second outer sections, each of which is connected at a first end to the middle section of the head section and at a second end to the T-section, each of which further comprises a groove about which rotation occurs for the outer section; and an elbow connected at a first end by a first relatively thin material to the middle section of the head section and at a second end by a second relatively thin material to the T-section, wherein rotation occurs about the first relatively thin material, the first relatively thin material and the grooves being displaced from each other.

16. The apparatus of claim 15 wherein the head unit, T-section and hinge means comprise polypropolene.

17. The apparatus of claim 1 which further comprises:
a first rod rotatably attached to one end of a side of the T-section and
a second rod slidably interconnected with the first rod.

18. Apparatus for holding materials which is removably attachable to a surface, which apparatus comprises:
a head section comprising a first and a second flap section and a middle section, the first flap section being attached by a first hinge to a first end of the middle section, the second flap section being attached by a second hinge to a second end of the middle section;
a T-section attached at one end by a hinge means to a side of the middle section; and
a T-insert section having means for removably interlocking the T-insert section into the T-section,
(a) the T-section further comprises at least one first means and
(b) the T-insert section further comprises at least one second means, which first and second means together provide holding means for holding materials.

19. The apparatus of claim 18 wherein the hinge means comprises:
first and second outer sections, each of which is connected at a first end to the middle section of the head section and at a second end to the T-section, each of which further comprises a groove about which rotation occurs for the outer section; and
an elbow connected at a first end by a first relatively thin material to the middle section of the head section and at a second end by a second relatively thin material to the T-section, wherein rotation occurs about the first relatively thin material, the first relatively thin material and the grooves being displaced from each other.

20. Apparatus for holding materials which is removably attachable to a surface, which apparatus comprises:
a head section comprising a first and a second flap section and a middle section, the first flap section being attached by a first hinge to a first end of the middle section, the second flap section being attached by a second hinge to a second end of the middle section;
a T-section attached at one end by a hinge means to a side of the middle section; and
a T-insert section having means for removably interlocking the T-insert section into the T-section and a pocket for holding materials.

21. The apparatus of claim 20 wherein the hinge means comprises:
first and second outer sections, each of which is connected at a first end to the middle section of the head section and at a second end to the T-section, each of which further comprises a groove about which rotation occurs for the outer section; and
an elbow connected at a first end by a first relatively thin material to the middle section of the head section and at a second end by a second relatively thin material to the T-section, wherein rotation occurs about the first relatively thin material, the first relatively thin material and the grooves being displaced from each other.

22. Apparatus for holding materials which is removably attachable to a surface, which apparatus comprises:
a head section comprising a first and a second flap section and a middle section, the first flap section being attached by a first hinge to a first end of the middle section, the second flap section being attached by a second hinge to a second end of the middle section;
a T-section attached at one end by a hinge means to a side of the middle section; and
a T-insert section having means for removably interlocking the T-insert section into the T-section and a pocket for holding materials,
(a) the T-section further comprises at least one first means and
(b) The T-insert section further comprises at least one second means, which first and second means together provide holding means for holding materials.

23. The apparatus of claim 22 wherein the hinge means comprises:
first and second outer sections, each of which is connected at a first end to the middle section of the head section and at a second end to the T-section, each of which further comprises a groove about which rotation occurs for the outer section; and
an elbow connected at a first end by a first relatively thin material to the middle section of the head section and at a second end by a second relatively thin material to the T-section, wherein rotation occurs about the first relatively thin material, the first relatively thin material and the grooves being displaced from each other.

24. The apparatus of claim 18 which further comprises:
a first rod rotatably attached to one end of a side of the T-section and
a second rod slidably interconnected with the first rod.

* * * * *